July 31, 1956 R. F. SCHAUB 2,756,739
HOT WATER HEATING SYSTEMS
Filed May 1, 1952
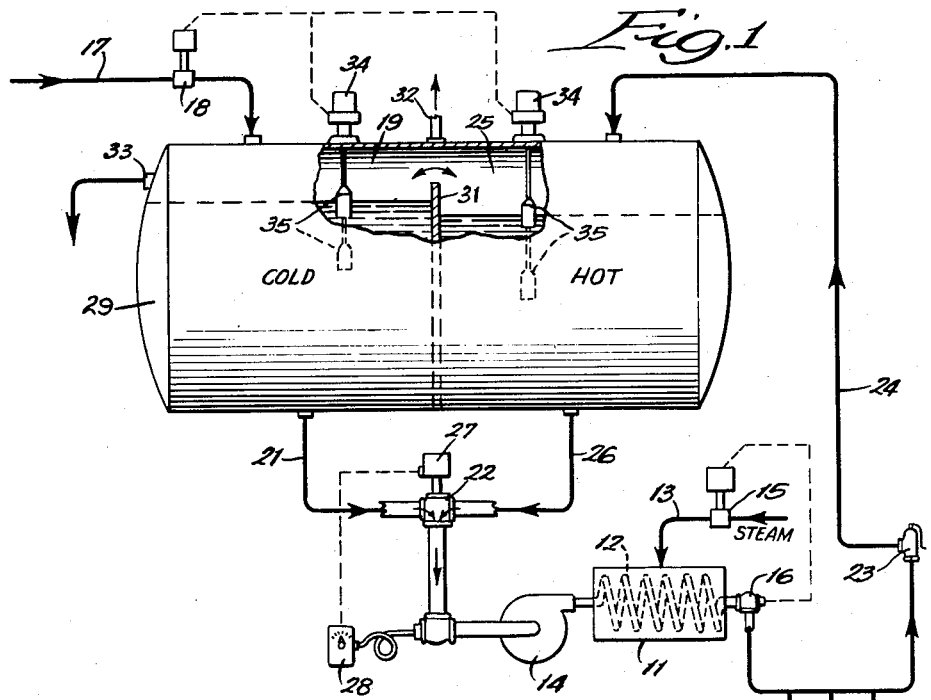
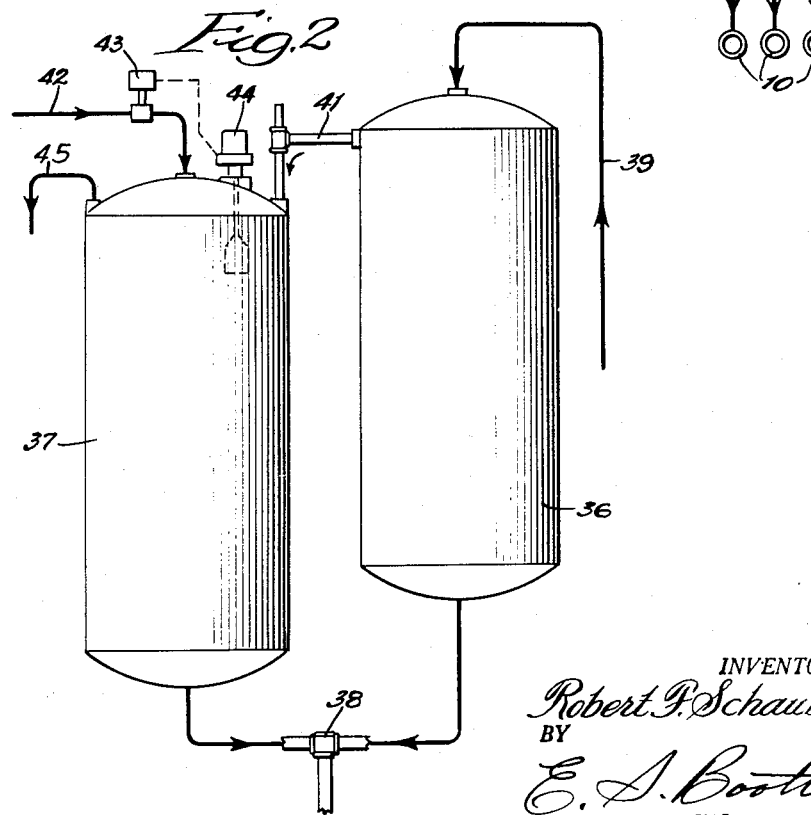
INVENTOR:
Robert F. Schaub,
BY
E. A. Booth,
ATTORNEY

# United States Patent Office 2,756,739
Patented July 31, 1956

2,756,739

HOT WATER HEATING SYSTEMS

Robert F. Schaub, Chicago, Ill., assignor to Fred H. Schaub Engineering Co., Inc., Chicago, Ill., a corporation of Illinois Application May 1, 1952, Serial No. 285,403

10 Claims. (Cl. 126—362)

This invention relates to hot water heating systems and more particularly to systems for supplying hot water to a fluctuating load with a substantially constant heat input.

Many types of apparatus using hot water as, for example, laundry devices have a demand for water which fluctuates at frequent intervals between zero or substantially zero and maximum. With heating systems of a type having no storage capacity, it is therefore necessary to provide a capacity equal to the maximum demand and this results in a high equipment cost and inefficient use of the equipment. For example, when the water is heated by steam, the boiler and heat exchanger capacity must be sufficient to meet the maximum instantaneous demand with the result that an extremely large boiler and heat exchanger are required.

When hot water storage tanks are employed to store hot water during low periods and to deliver water during high periods, large tanks are required and difficulty is encountered in maintaining the stored water at a desired high temperature. Therefore, while such systems tend to reduce the required capacity of the heating devices, such as the boiler and heat exchanger, they are not entirely satisfactory.

The present invention is predicated on the provision of a heating device whose capacity is equal to the average demand and which functions continuously at a substantially uniform rate to increase the temperature of a constant flow of water from an intermediate temperature to the desired high temperature. During low demand periods excess hot water is returned to a hot water storage container from which hot water is withdrawn and mixed with cold water to provide the intermediate temperature water supply to the heating device. In this way the heating device need only be large enough to heat the average demand and storage of water at a high temperature is minimized.

It is therefore one of the objects of the present invention to provide a hot water heating system in which the water heating device operates continuously at a rate equal to the average demand rate.

Another object is to provide a water heating system in which the heating device functions to raise the temperature of a constant flow of water from an intermediate temperature to the high desired temperature.

Still another object is to provide a water heating system in which the quantity of hot water stored is maintained at a minimum.

A further object is to provide a water heating system in which quantities of hot water in excess of the storage capacity are mixed with incoming cold water to raise the temperature thereof.

A still further object is to provide a water heating system which can easily be constructed by conversion of existing systems.

The above and other objects and advantages of the invention will be more readily apparent when viewed in connection with the accompanying drawings, in which Figure 1 is a diagrammatic view with parts in section of a hot water heating system embodying the invention; and Figure 2 is a partial view illustrating an alternative tank arrangement.

The heating system of the present invention is adapted to supply hot water to a load indicated diagrammatically at 10 and which may represent one or more laundry machines or other types of apparatus consuming hot water and having a variable demand therefor. Water is heated in a heating device 11 which may be any desired type such as an injection type heater, a heat exchanger or the like. The heating device is illustrated as a heat exchanger including a coil 12 to receive the water and supplied with steam through a connection 13. Water is forced through the coil 12 at a constant rate by means of a pump 14 and the outlet of the coil is connected to the load 10 as shown. Steam is supplied through the connection 13 under the control of a valve 15 which is controlled automatically in response to the temperature of the outgoing water by means of a thermostatic unit 16 connected to the valve. Since control valves of this type are conventional in the art, no detailed description of the valve and temperature control device are believed to be necessary.

Cold water is supplied from any available source, such as a conventional city water supply, through a connection 17 under the control of an electrically operated valve 18. The water from the connection 17 is supplied to a cold water container 19 from which cold water may be withdrawn through a connection 21 to a mixing device 22. Excess hot water discharged from the heating device 11 which is not consumed by the load 10 is returned past a relief valve 23 through a connection 24 to a hot water container 25. Hot water from the container 25 flows through a connection 26 to the mixing device 22.

The mixing device includes valves not shown to regulate the relative quantities of hot and cold water supplied thereto so that the mixed water will be at a desired constant temperature. The mixing device is controlled through a control unit 27 which may be any desired type and which is shown as an electrical unit which is in turn controlled through an instrument 28 responsive to the temperature of the water leaving the mixing device. The mixed water is conducted to the pump 14; from the pump it flows through the heating device 11.

In the form shown in Figure 1 the hot and cold water containers are provided by a single relatively large tank 29 mounted horizontally and having a partition 31 therein which terminates beneath the top of the tank. The space above the partition 31 therefore constitutes an overflow passage between the hot and cold water containers through which water can flow in the event the level in either container becomes excessive. Preferably the tank is vented at 32 and may include an overflow connection 33 near the top of the cold water container.

In operation, assume that water is to be supplied to the load at 180° F. and that the incoming water from the connection 17 is at 60° F. The mixing device is set to provide mixed water at, for example, 120° F. and the pump 14 is adjusted to pump a volume of water equal to the maximum load requirements. With the apparatus operating when the load demand is less than maximum, a constant quantity of water at 120° F. will be pumped into the heating device 11 and its temperature will be raised therein to 180° F. The excess hot water not consumed by the load will return through the relief valve 23 and connection 24 to the hot water container 25. The mixing device will withdraw approximately equal quantities of hot and cold water from the containers to form a mixture at the desired intermediate temperature. At times, when the load is at maximum, there will be no hot water or substantially no hot water returned to the container 25 and the level therein will drop. Preferably, however, this container is made large enough to accommodate the expected load fluctuations so that all of the hot water will never be completely exhausted therefrom. Since the hot water container supplies only about half of the incoming water it will be seen that the quantity of hot water required to be stored is relatively small.

If an extended period of low load should occur, the hot water in the container 25 might rise above the top of the partition 31 and therefore into the cold water container 19. The hot water, however, is not wasted unless the level should rise above the overflow 33 as it serves to increase the cold water temperature so that upon a subsequent demand a greater quantity of cold water and a lesser quantity of hot water will be supplied to the mixing device to achieve the desired intermediate temperature.

The quantity of fresh cold water supplied is preferably regulated in response to the level of water in the containers. For this purpose, each container is provided with a level control unit 34 having floats 35 extending into the respective containers to respond to variations of level therein. The units 34 may preferably be of the type more particularly described and claimed in the patent to Binford No. 2,564,655. The control devices 34 are connected in parallel to the valve 18 and open the valve when the level in either container drops below a desired point. For example, when the level in the cold water container falls, the corresponding control device 34 will open the valve 18 to admit fresh cold water to bring the level up to the desired point. If the level in the hot water container should fall below a desired minimum level due to extended high demand period, the control device to the hot water container will open the valve 18 regardless of the level in the cold water container. At this time, the cold water container will be filled to an overflow level and cold water therefrom will flow over the partition 31 into the hot water container to eliminate any possibility of completely emptying the hot water container. This condition will occur rarely if the apparatus is properly designed for the particular job, but the control as described constitutes a safety factor to prevent complete emptying of the hot water container under severe conditions.

In existing installations where the hot water storage tank is available the system can readily be converted to the present hot water heating system without requiring a completely new tank such as the tank of Figure 1. Such a system as shown in Figure 2 may include an existing hot water tank 36. To convert to the present system the tank 36 may be retained and an additional cold water tank 37 which may be the same size as the hot water tank or smaller than the hot water tank may be added. The two tanks may be connected to a mixing device 38 similar to the mixing device 22 of Figure 1 and the return connection 39 similar to the connection 24 of Figure 1 may be made to the hot water tank. The two tanks may be connected by an overflow connection 41 extending from the upper part of the hot water tank to the cold water tank which is preferably mounted at a lower level than the hot water tank to prevent reverse flow. The cold water tank 37 may be supplied with water through a connection 42 controlled by a valve 43 which is in turn controlled by a level responsive unit 44 similar to the units 34 of Figure 1. The cold water tank 37 may be provided with an overflow 45.

Operation of this apparatus is generally the same as that of the apparatus shown in Figure 1, the main difference being that the hot and cold water containers are separated tanks, rather than separated compartments in a single tank.

While two embodiments of the invention have been shown and described in detail herein, it will be understood that they are illustrative only and are not intended as a definition of the scope of the invention, reference being had for this purpose to the appended claims.

What is claimed is:

1. A water heating system comprising a container for hot water, a source of cold water, a mixing device connected to the source and the container to receive water therefrom, valve means associated with the mixing device and responsive to the temperature of the mixed water to control the relative supplies of hot and cold water to the mixing device to provide a mixture at a substantially constant temperature, a heating device operating at a constant rate connected to the mixing device to receive the mixture therefrom and to elevate it to a higher temperature, a connection from the output side of the heating device to a load, a return connection bypassing the load from the output side of the heating device to the hot water container and a pump to circulate water at a constant rate from the mixing device through the heating device.

2. A water heating system comprising a container for hot water, a source of cold water, a mixing device connected to the source and the container to receive water therefrom, valve means associated with the mixing device and responsive to the temperature of the mixed water to control the relative supplies of hot and cold water to the mixing device to provide a mixture at a substantially constant temperature, a heating device connected to the mixing device to receive the mixture therefrom and to elevate it to a higher temperature, a pump to circulate a constant volume of water from the mixing device through the heating device, a connection from the heating device to a load, and a return connection bypassing the load from the heating device to the hot water container.

3. A water heating system comprising a container for hot water, a source of cold water, a mixing device connected to the source and the container to receive water therefrom, valve means associated with the mixing device and responsive to the temperature of the mixed water to control the relative supplies of hot and cold water to the mixing device to provide a mixture at a substantially constant temperature, a heating device connected to the mixing device to receive the mixture therefrom and to elevate it to a higher temperature, a pump to circulate a constant volume of water from the mixing device through the heating device, a connection from the heating device to a load, a return connection bypassing the load from the heating device to the hot water container, said source of cold water being a cold water container, means forming an overflow connection from the upper part of the hot water container to the cold water container, a supply connection for cold water to the cold water container, and control means responsive to the water level in the cold water container to control the supply of cold water through the supply connection.

4. A water heating system comprising a container for hot water, a source of cold water, a mixing device connected to the source and the container to receive water therefrom, valve means associated with the mixing device and responsive to the temperature of the mixed water to control the relative supplies of hot and cold water to the mixing device to provide a mixture at a substantially constant temperature, a heating device connected to the mixing device to receive the mixture therefrom and to elevate it to a higher temperature, a pump to circulate a constant volume of water from the mixing device through the heating device, a connection from the heating device to a load, a return connection bypassing the load from the heating device to the hot water container, said source of cold water being a cold water container, means for forming an overflow passage between the containers, a supply connection for cold water to the cold water container, and a pair of control devices responsive to the water level in the containers respectively and acting in parallel to control the supply of cold water through the supply connection.

5. A water heating system comprising a hot water container, a cold water container, a mixing device connected to both of the containers to receive water therefrom and to mix the water, valve means associated with the mixing device and responsive to the temperature of the mixed water to control the relative quantities of hot and cold water thereby to maintain a constant mixed water temperature, a water heating device of constant heating capacity connected to the mixing device to receive mixed water therefrom, a pump to circulate a constant volume of mixed water through the heating device, a connection from the heating device to a load, and a return connection bypassing the load from the heating device to the hot water container.

6. A water heating system comprising a hot water container, a cold water container, a mixing device connected to both of the containers to receive water therefrom and to mix the water, valve means associated with the mixing device and responsive to the temperature of the mixed water to control the relative quantities of hot and cold water thereby to maintain a constant mixed water temperature, a water heating device of constant heating capacity connected to the mixing device to receive mixed water therefrom, a pump to circulate a constant volume of mixed water through the heating device, a connection from the heating device to a load, a return connection bypassing the load from the heating device to the hot water container, means forming an overflow connection from the upper part of the hot water container to the cold water container, a cold water supply connection to the cold water container, and control means responsive to the water level in the cold water container to control the supply of water through the supply connection.

7. A water heating system comprising a hot water container, a cold water container, a mixing device connected to both of the containers to receive water therefrom and to mix the water, valve means associated with the mixing device and responsive to the temperature of the mixed water to control the relative quantities of hot and cold water thereby to maintain a constant mixed water temperature, a water heating device of constant heating capacity connected to the mixing device to receive mixed water therefrom, a pump to circulate a constant volume of mixed water through the heating device, a connection from the heating device to a load, a return connection bypassing the load from the heating device to the hot water container, means forming an overflow passage between the upper parts of the containers, a supply connection for cold water to the cold water container, and a pair of control devices responsive to the water levels in the containers respectively and acting in parallel to control the supply of cold water through the supply connection.

8. The construction of claim 5 in which the containers are formed by a single tank having a vertical partition therein terminating short of its top to leave an overflow passage between the containers.

9. The construction of claim 5 in which the containers are separate tanks at different levels with the hot water tank at the higher level and there is an overflow connection from the upper part of the hot water tank to the cold water tank.

10. A water heating system comprising a tank adapted to contain hot water, an external circuit having an outlet connection from the tank and a return connection to the tank and forming with the tank a closed loop system, a pump connected in the closed loop system to cause a substantially constant circulation of water from the tank into the external circuit, a connection to the external circuit posterior to the pump to withdraw heated water therefrom for use, heating means connected in the closed loop system at a point therein anterior to the last named connection to supply heat to the water in the system at a substantially constant rate, a cold water supply connection to the system anterior to the heating means to supply cold water to the system to mix with the heated water from the tank flowing therethrough, and valve means in the closed loop system and responsive to the temperature of the water in the external circuit anterior to the heating means to control the relative quantities of cold and hot water supplied to the system to maintain the temperature of the water in the external circuit constant.

References Cited in the file of this patent

UNITED STATES PATENTS

| | | |
|---|---|---|
| 289,847 | McGinley | Dec. 11, 1883 |
| 337,227 | Barden | Mar. 2, 1886 |
| 1,080,547 | Gamble | Dec. 9, 1913 |
| 1,127,627 | Johnson | Feb. 9, 1915 |
| 1,382,569 | Tait | June 21, 1921 |
| 1,722,884 | Autrey | July 30, 1929 |
| 1,772,834 | Hopkins | Aug. 12, 1930 |
| 1,874,964 | Goes | Aug. 30, 1932 |
| 1,983,199 | Stith | Dec. 4, 1934 |
| 2,291,023 | Burklin | July 28, 1942 |